(12) United States Patent
Lou et al.

(10) Patent No.: US 8,755,940 B2
(45) Date of Patent: Jun. 17, 2014

(54) MODELING AND CONTROL OPTIMIZATION SYSTEM FOR INTEGRATED FLUIDIZED BED COMBUSTION PROCESS AND AIR POLLUTION CONTROL SYSTEM

(75) Inventors: Xinsheng Lou, West Hartford, CT (US); George D. Mylchreest, Simsbury, CT (US); Carl H. Neuschaefer, Enfield, CT (US)

(73) Assignee: Alstom Technology Ltd, Baden (CH)

( * ) Notice: Subject to any disclaimer, the term of this patent is extended or adjusted under 35 U.S.C. 154(b) by 1090 days.

(21) Appl. No.: 12/196,554

(22) Filed: Aug. 22, 2008

(65) Prior Publication Data
US 2010/0049369 A1 Feb. 25, 2010

(51) Int. Cl.
*F23N 5/00* (2006.01)
(52) U.S. Cl.
USPC ........... 700/274; 700/266; 422/105; 422/114; 422/115; 436/55; 431/18
(58) Field of Classification Search
USPC .................. 700/266, 274; 422/105, 114, 115; 436/55; 431/18
See application file for complete search history.

(56) References Cited

U.S. PATENT DOCUMENTS

2006/0047564 A1 3/2006 Boyden et al.
2007/0142975 A1 6/2007 Piche

OTHER PUBLICATIONS

Jean-Xavier Morin, "Recent ALSTOM POWER Large CFB and Scale up aspects including steps to Supercritical", 47 th International Energy Agency Workshop on Large Scale CFB Zlotnicki, Poland Oct. 13, 2003.*

\* cited by examiner

*Primary Examiner* — Shogo Sasaki
(74) *Attorney, Agent, or Firm* — Buchanan Ingersoll & Rooney PC

(57) ABSTRACT

A system for optimizing and controlling a circulating fluidized bed combustion (FBC) system (7) and an air pollution control (APC) system (9) includes a controller (205, 305, 406) and an optimizer (210, 310). The controller (205, 305, 406) is connected to the FBC system (7) and/or the APC system (9). The optimizer (210, 310) is connected to the controller (205, 305, 406). The optimizer (210, 310) provides an optimized setpoint (220, 320, 420) to the controller (205, 305, 406) based on an economic parameter (235, 335, 435) and system outputs (230, 330) from the FBC system (7) and the APC system (9). The controller (205, 305, 406) provides an optimized input (215, 315) to the FBC system (7) and/or the APC system (9) based on the optimized setpoint (220, 320, 420) from the optimizer (210, 310) to optimize operation of the FBC system (7) and/or the APC system (9).

19 Claims, 5 Drawing Sheets

MODELING AND CONTROL OPTIMIZATION SYSTEM FOR INTEGRATED FLUIDIZED BED COMBUSTION PROCESS AND AIR POLLUTION CONTROL SYSTEM

TECHNICAL FIELD

The present disclosure relates generally to a modeling and control optimization system for a fluidized bed combustion process and an air pollution control system, and more particularly, to an integrated modeling and control optimization system for a circulating fluidized bed boiler and a flash dryer absorber system.

BACKGROUND

Fluidized bed combustion (FBC) is a combustion technology used in power plants primarily to burn solid fuels. FBC power plants are more flexible than conventional plants in that they can be fired on coal, coal waste or biomass, among other fuels. The term FBC covers a range of fluidized bed processes, including circulating fluidized bed (CFB) boilers, bubbling fluidized bed (BFB) boilers and other variations thereof. In an FBC power plant, fluidized beds suspend solid fuels on upward-blowing jets of air during the combustion process, causing a tumbling action which results in turbulent mixing of gas and solids. The tumbling action provides a means for more effective chemical reactions and heat transfer.

During the combustion process of fuels which have a sulfur-containing constituent, e.g., coal, sulfur is oxidized to form primarily gaseous $SO_2$. In particular, FBC reduces the amount of sulfur emitted in the form of $SO_2$ by a desulfurization process. A suitable sorbent, such as limestone containing $CaCO_3$, for example, is used to absorb $SO_2$ from flue gas during the combustion process. In order to promote both combustion of the fuel and the capture of sulfur, FBC power plants operate at temperatures lower than conventional combustion plants. Specifically, FBC power plants typically operate in a range between about 850° C. and about 900° C. Since this allows coal to combust at cooler temperatures, $NO_x$ production during combustion is lower than in other coal combustion processes.

Boiler systems of FBC power plants are generally associated with limestone feed systems for sulfur capture. Processed limestone fed to a boiler is typically conditioned by means of size reduction machines to specific size ranges to allow for the desulfurization process to proceed efficiently.

Air systems in an FBC power plant are designed to perform many functions. For example, air is used to fluidize the bed solids consisting of fuel, fuel ash and sorbent, and to sufficiently mix the bed solids with air to promote combustion, heat transfer and control (reduction) of emissions (e.g., $SO_2$, CO, $CO_2$, $NO_x$ and $N_2O$). In order to accomplish these functions, the air system is configured to inject air, designated primary air (PA), secondary air (SA), fluidizing air to a fluidized bed heat exchanger (FBHE), and over fired air (OFA), for example, at various locations and at specific velocities and quantities.

A distributed control system (DCS) is typically used to control the processes described above in an FBC plant, based upon operator input. To this end, an operator adjusts FBC system parameters in an attempt to maintain optimal operating conditions such as maximizing combustion of the fuel while minimizing $SO_2$ emissions, for example.

In general, FBC power plants evolved from efforts to find a combustion process able to control pollutant emissions without external emission controls (such as scrubbers). Although FBC power plants have lower pollutant emissions than conventional combustion plants, ongoing efforts continually strive to reduce pollutant emissions to even lower levels. Thus, it has been found that combining an FCB plant, and more specifically, a CFB boiler, with an air pollution control (APC) system downstream from the CFB boiler provides increased sulfur capture over conventional power plants (even those utilizing conventional external emission controls such as scrubbers), as well as FBC power plants without the APC system. In addition to reducing overall sulfur capture at a back end of the combustion process, an APC system provides flexibility in operations of the FBC power plant. For example, by reducing $SO_2$ emissions at the back end, less limestone is required upstream in the combustion process for a given $SO_2$ emissions level.

Specifically, an APC system known as a flash dryer absorber (FDA) has been developed for use in conjunction with a CFB boiler to substantially enhance sulfur capture, thereby effectively reducing pollutant emissions to even lower levels. Thus, a CFB-FDA system offering a cost-effective solution for enhanced sulfur capture has been developed.

In a typical CFB-FDA system, a portion of sulfur is captured in the CFB boiler using in-furnace limestone injection, while additional sulfur is captured by the FDA in a backend process utilizing residual limestone in flying ash exiting the CFB boiler. Therefore, it is desirable to optimize the CFB-FDA as one integrated system, thereby allowing economically efficient use of limestone according to plant conditions at any given time, particularly during transients in plant operations.

In addition to an amount of limestone in an FDA, sulfur capture also depends upon temperature and relative humidity in the FDA. However, current FDA control systems neither measure nor control relative humidity in the FDA. Thus, it is desirable that an integrated CFB-FDA control system measure relative humidity and adjust operating parameters of the CFB-FDA accordingly.

Process and equipment integration and optimization of the CFB-FDA system is also needed. More specifically, CFB-FDA integrated processes are currently not controlled at economically optimum operating conditions. This is especially true during load changes and when other plant disturbances such as changes in ash loading, for example, occur. Complex relationships between many variables which affect performance of the CFB-FDA complicate efforts to control the integrated CFB-FDA process.

Conventional power plant simulators are limited to steam/water side process dynamics and only very simple combustion or furnace process dynamics are modeled; dynamic models of complex atmosphere control systems such as FDAs are not available at this time.

In addition, CFB boiler and APC controls are currently employed using separate hardware and software platforms for the CFB boiler and the APC. Thus, it is desired to develop a standardized package which can be integrated into an existing DCS of an FBC power plant using a CFB-FDA system. Developing a standardized control package will also enable implementation of the control package for use with FBC power plants which use different types of boilers, such as BFB boilers, as well as different APC systems such as selective catalytic reduction (SCR) and flue gas desulfurization (FGD) systems, for example.

Accordingly, it is desired to develop an integrated modeling and optimization control system for a fluidized bed combustion process and air pollution control system and, more specifically, an integrated modeling and optimization control system for a fluidized bed combustion process and air pollution control system which overcomes the shortcomings described above.

SUMMARY

According to the aspects illustrated herein, there is provided a system for optimizing and controlling a circulating fluidized bed combustion system and an air pollution control system. The system includes a controller and an optimizer. The controller is operably connected to the fluidized bed combustion system and/or the air pollution control system. The optimizer is operably connected to the controller. The optimizer provides an optimized setpoint to the controller based on an economic parameter and system outputs from the fluidized bed combustion system and the air pollution control system. The controller provides an optimized input to the fluidized bed combustion system and/or the air pollution control system based on the optimized setpoint from the optimizer to optimize an operation of the fluidized bed combustion system and/or the air pollution control system.

According to the other aspects illustrated herein, a system for optimizing and controlling a flash dryer absorber includes a controller operably connected to the flash dryer absorber, and a steady state optimizer operably connected to the controller. The steady state optimizer receives an output from the flash dryer absorber and outputs an optimized setpoint to the controller based on an economic parameter and the output from the flash dryer absorber. The controller receives the output from the flash dryer absorber and outputs an optimized input to the flash dryer absorber based on the output from the flash dryer absorber and the optimized setpoint from the steady state optimizer such that the optimized input optimizes operation of the flash dryer absorber.

According to the other aspects illustrated herein, a system for optimizing and controlling a circulating fluidized bed combustion system and a flash dryer absorber includes a controller operably connected to the fluidized bed combustion system and the flash dryer absorber, an optimizer operably connected to the controller. The optimizer provides an optimized setpoint to the controller based on an economic parameter and a system output from the fluidized bed combustion system and the flash dryer absorber. The controller provides an optimized input to the fluidized bed combustion system and the flash dryer absorber based on the optimized setpoint from the optimizer to optimize operation of the fluidized bed combustion system and the flash dryer absorber.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Disclosed herein is an integrated modeling, simulation and optimization control system for, generally, a combined fluidized bed combustion (FBC) system and an air pollution control (APC) system and, specifically, for a circulating fluidized bed (CFB) and flash dryer absorber (FDA) integrated system. The integrated modeling, simulation and optimization system according to an exemplary embodiment utilizes a systematic approach, e.g., an approach implementing design of experiments (DOE), neural network (NN) modeling and optimization, dynamic test design and model identification, and model based controls and optimization, for example, as will now be described in further detail with reference to the accompanying drawings.

Figure 1:
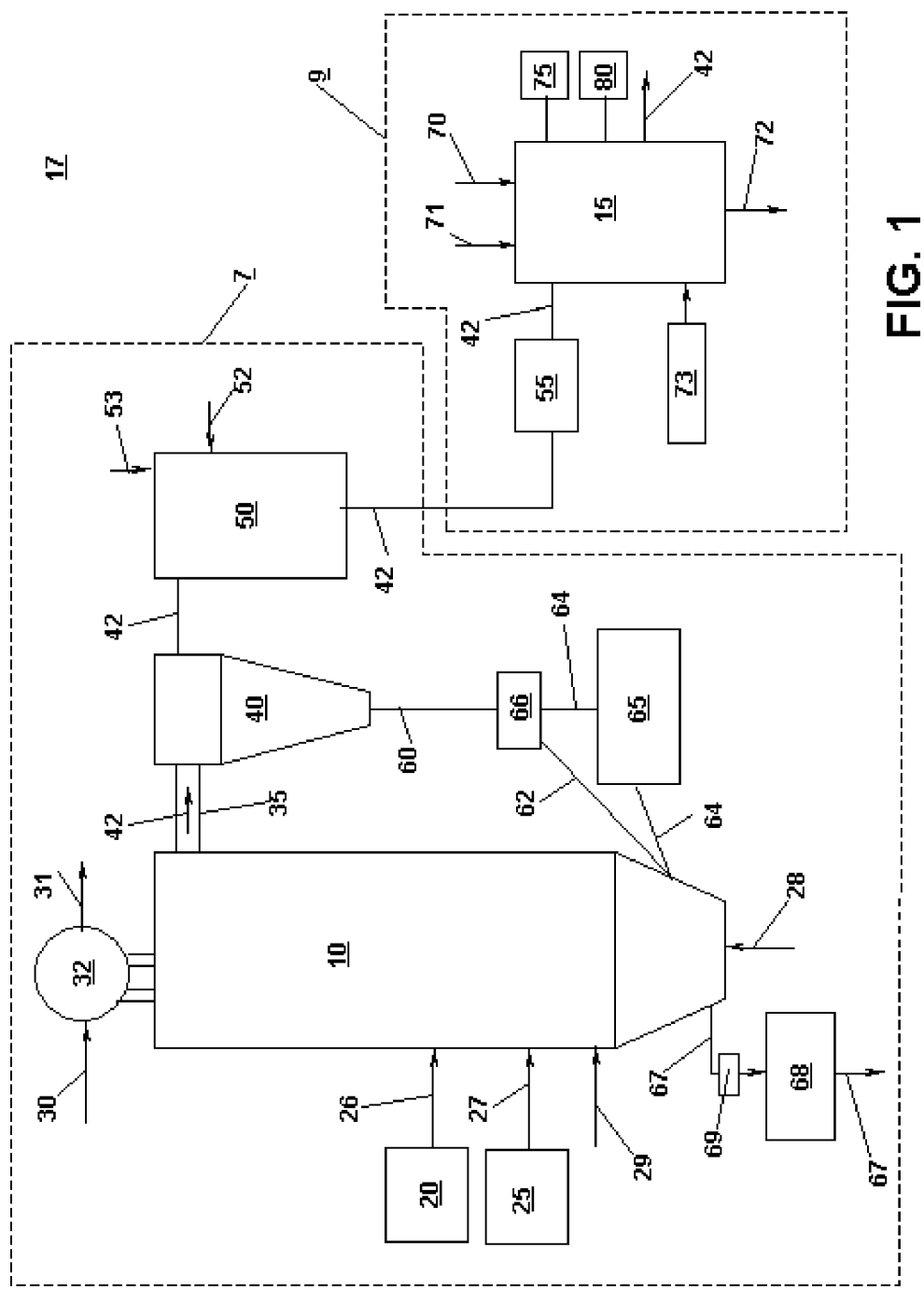
FIG. 1 is a block diagram of a circulating fluidized bed (CFB) furnace and flash dryer absorber (FDA)

Referring to FIG. 1, an exemplary embodiment of a combustion system 7 and an APC system 9 of an FBC power plant is shown. The combustion system 7 includes a furnace 10 (e.g., a boiler), which according to an exemplary embodiment is an FBC furnace 10 and, more specifically, may be a CFB furnace or a bubbling fluidized bed (BFB) furnace, for example, but is not limited thereto. In addition, the APC system 9 in the FBC power plant includes an FDA 15. In alternative exemplary embodiments, however, the APC system 9 may be a spray dryer absorber (SDA), a wet flue gas desulfurization (FGD) system, a dry FGD system, a selective catalytic reduction (SCR) system, a selective non-catalytic reduction (SNCR) system, a mercury capture system, a carbon dioxide ($CO_2$) capture system, an electrostatic precipitator and/or a filter, for example, without being limited to the foregoing. Thus, as shown in FIG. 1, a circulating fluidized bed and flash dryer absorber (CFB-FDA) system 17 according to an exemplary embodiment includes a combination of a circulating fluidized bed combustion system 7 and an FDA system 9. However, as stated above, alternative exemplary embodiments are not limited to the foregoing combinations, but may be combinations of any type of FBC combustion system 7 with any type of APC system 9.

In the CFB-FDA system 17, a fuel source 20 and a limestone source 25 feed fuel 26 (e.g., coal) and limestone 27, respectively, to the CFB furnace 10. Primary air (PA) 28 and secondary air (SA) 29 are also supplied to the CFB furnace 10 from an external air source (not shown). Feed water 30 is supplied to a drum 32 operably connected to tubes passing within the FBC furnace 10. Heat from the combustion process in the CFB furnace 10 boils the feed water 30 flowing through the tubes to create steam 31 which may be used to power a turbine generator (not shown), for example.

A flue 35 connects the CFB furnace 10 to a separator 40 such as a cyclone. Combustion gases 42, e.g., flue gas, from the CFB furnace 10 pass through the flue 35 and the cyclone 40 into an economizer 50, also known as a back pass, which receives sootblow 52 and spray water 53. The flue gas 42 then passes through an air preheater 55 and on to the FDA 15. The combustion gases 42 are then exhausted from the FDA 15 to the atmosphere via a stack (not shown).

Particulates 60, e.g., solid particles of fuel, entrained in the combustion gases 42 leaving the CFB furnace 10 through the flue 35 are separated by the cyclone 40 and are then returned to the CFB furnace 10, as shown in FIG. 1. More specifically, a first portion 62 of the particulates 60 is returned directly to the CFB furnace 10 from the cyclone 40 while a second portion 64 of the particulates 60 is returned to the CFB furnace 10 through at least one fluidized bed heat exchanger (FBHE) 65. A ratio of the first portion 62 to the second portion 64 is controlled based upon a position of at least one FBHE valve 66.

Bottom ash 67 is removed from the CFB furnace 10 through at least one fluidized bed ash cooler (FBAC) 68. A removal rate of the bottom ash 67 from the CFB furnace 10 is controlled by at least one FBAC valve 69. Bottom ash 67 removed from the CFB furnace 10 is stored in an external facility (not shown).

Still referring to FIG. 1, the FDA 15 receives the combustion gases 42 from the air preheater 55. During operation of the CFB-FDA system 17, limestone 27 not utilized in the combustion process within the CFB furnace 10 is entrained in the combustion gases 42 leaving the CFB furnace 10 via the flue 35 and the economizer 50, and is thereby carried over into the FDA 15. The unutilized limestone 27 carried over into the FDA 15 is used in the FDA 15 to capture, e.g., remove, sulfur from the combustion gases 42, thereby effectively reducing a sulfur content of the combustion gases 42 prior to exhausting combustion gases to the atmosphere. In an exemplary embodiment, lime 70, e.g., supplemental lime, may be injected into the FDA 15 to further enhance sulfur capture therein, as described in non-provisional U.S. patent application Ser. No. 12/196,631 filed contemporaneous with the present patent application, the full disclosure of which is herein explicitly incorporated by reference. The supplemental lime 70 is injected into or upstream of the FDA 15 from a lime source (not shown). Water 71 from an external source (not shown) is also supplied to the FDA 15 to hydrate the supplemental lime 70 therein. Fly ash 72 is removed from the FDA 15 to be delivered to an external facility (not shown). An ash screw 73 maintains a flow rate of the fly ash 72 to control an inventory of the fly ash 72 in the FDA 15.

Both the supplemental lime 70 and the limestone 27 are costly, however, the lime is more expensive than the limestone. Therefore, an economic efficiency of the CFB-FDA system 17 is effectively enhanced and/or substantially improved when an optimum ratio of the limestone 27 to the lime 70 is maintained. Thus, a control system according to an exemplary embodiment has an advantage of minimizing an amount of the lime 70 injected into the FDA 15 based upon operating conditions of the CFB-FDA system 17, for example. It will be noted that the control system is not limited to the foregoing function or advantage. Rather, the control system according to an exemplary embodiment performs other functions associated with operation, control, modeling and optimization of the CFB-FDA system 17, as will be described in further detail below.

Sulfur capture in the FDA 15 is also affected by temperature and relative humidity of the FDA 15. Thus, a temperature sensor 75 and a relative humidity sensor 80 provide measurements of the temperature and relative humidity, respectively, in the FDA 15, which are used as inputs to the control system according to an exemplary embodiment.

Figure 2:
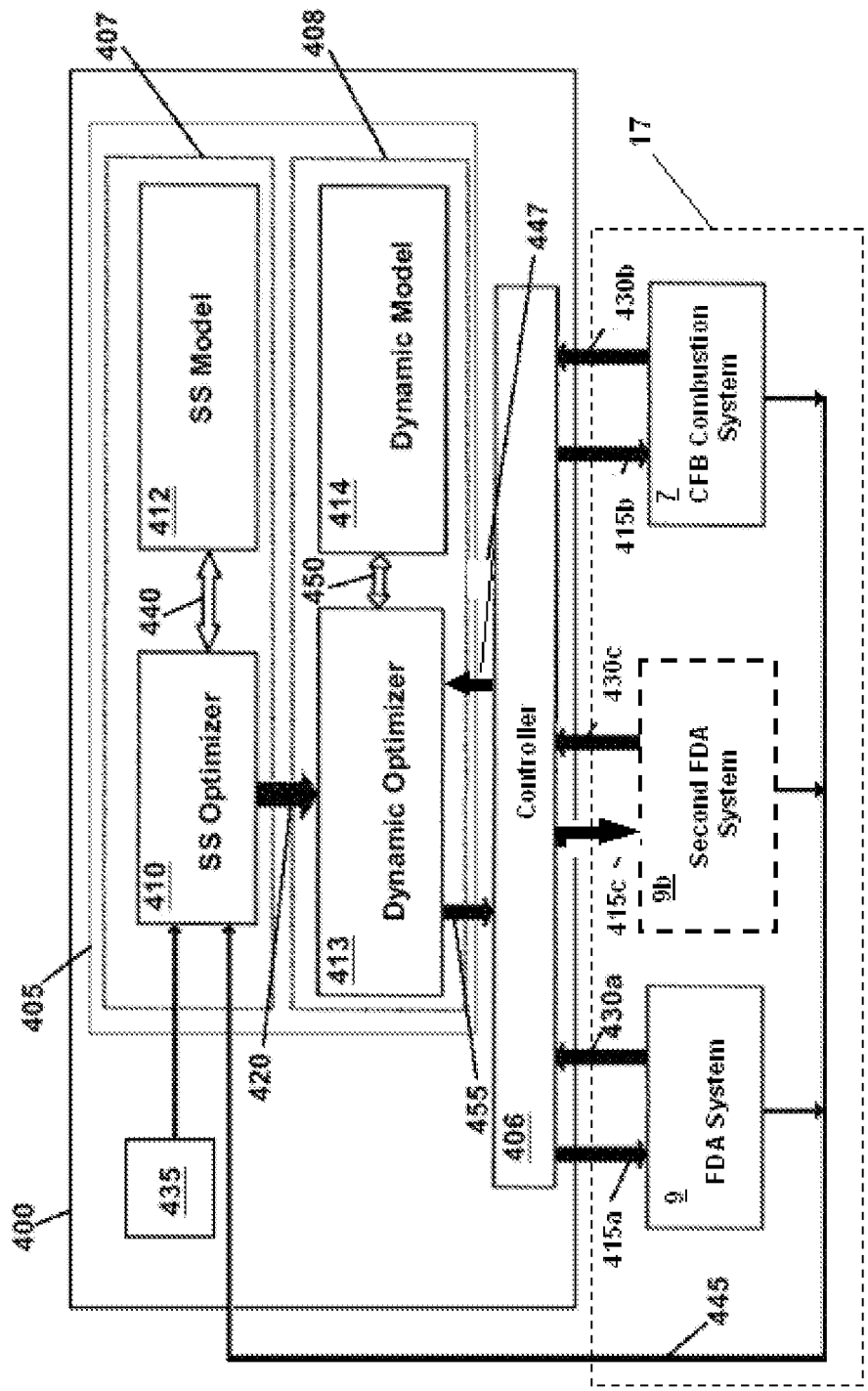
FIG. 2 is a block diagram of an integrated modeling and optimization control system for a CFB-FDA system in accordance with the present invention.

As mentioned above, it is particularly difficult to effectively control operation of the CFB-FDA system 17 during non-steady state operation, such as during plant transients, disturbances and load changes, for example. This is further complicated when integrated control is required for multiple components, such as in an integrated CFB-FDA system 17 having more than one FDA system 9, for example, as shown in FIG. 2. Thus, in order to effectively optimize and/or control the integrated CFB-FDA system 17 during all stages of operation, specifically during steady state and transient operations, an integrated optimization and control system according to an exemplary embodiment includes steady state and dynamic models and optimizers, as will now be described in further detail with reference to FIG. 2. As shown in FIG. 2, an integrated optimization and control system 400 for a CFB-FDA system 17 includes an overall optimization and modeling module 405 and a controller 406. Further, the overall optimization and modeling module 405 includes a steady state module 407 and a dynamic module 408. The steady state module 407 includes a steady state (SS) economic optimizer 410 and a steady state model 412. The dynamic module 408 includes a dynamic optimizer 413 and a dynamic model 414.

The FDA system 9 and the CFB combustion system 7 each include inputs and outputs, which will be described in greater detail in reference to FIGS. 3 and 4. However, as shown in FIG. 2, respective inputs and outputs for the FDA system 9 and the CFB combustion system 7 are optimized by a common, e.g., integrated, optimization and control system 400. More specifically, inputs 415a and 415b, along with corresponding outputs 430a and 430b, associated with the FDA system 9 and the CFB combustion system 7, respectively, are optimized by the integrated optimization and control system 400.

In an exemplary embodiment, the inputs 415b and the outputs 430b associated with the CFB combustion system 7 are substantially the same as described hereinafter with reference to FIG. 3, but alternative exemplary embodiments are not limited thereto. Likewise, the inputs 415a and the outputs 430a associated with the FDA system 9 are substantially the same as described hereinafter with reference to FIG. 4, but are not limited thereto. Thus, any repetitive detailed description of the abovementioned inputs and outputs will hereinafter be omitted.

Still referring to FIG. 2, the steady state economic optimizer 410 provides optimized setpoints 420 to the dynamic optimizer 413 based upon economic parameters 435 and parameters 440 provided by the steady state model 412. In an exemplary embodiment, the economic parameters 435 are substantially the same as a combination of the economic parameters 235 (associated with the CFB combustion system 7) with the economic parameters 335 (associated with the FDA system 7), as described above in greater detail hereinafter with reference to FIGS. 3 and 4, respectively. Put another way, each of the economic parameters 235 and the economic parameters 335 are subsumed in the economic parameters 435 associated with the integrated optimization and control system 400.

The steady state model 412 according to an exemplary embodiment is a steady state multivariate process model 412 which includes an embedded CFB combustion model, an embedded FDA model or models and/or an embedded combined CFB-FDA model. The steady state multivariate process model 412 may be a data-driven empirical model (such as a neural network model developed based on historical plant operating and/or test data), a first principles model developed using process knowledge of the CFB-FDA system 17, or a hybrid model which integrates both a neural network model, for example, with a first principles model, but alternative exemplary embodiments are not limited thereto. In addition, the steady state multivariate process model 412 is integrated into the integrated optimization and control system 400, as shown in FIG. 2, or, in an alternative exemplary embodiment, may be a standalone platform. In yet another alternative exemplary embodiment, the steady state multivariate process model 412 is an add-in, which communicates with an existing plant simulator (not shown) to provide the signal 440 to the steady state optimizer 410.

As described hereinafter in further detail with reference to FIGS. 3 and 4, the steady state optimizer 410 optimizes the steady state setpoints 420 based on the economic factors 435

(provided, for example, by an operator) a steady state feedback signal 445 provided from the CFB-FDA system 17, and the parameters 440 provided from the steady state model 412. The steady state feedback signal 445 includes, but is not limited to, the outputs 430a and 430b, which are indicative of the CFB-FDA system 17 when in a steady state condition. The steady state optimizer 410 receives the steady state parameters periodically when the system 17 is in a steady state, such as after a load demand of the CFB furnace 10 changes, for example. Thus, optimized steady state setpoints 420 are supplied from the steady state optimizer 410 to the dynamic module 408, specifically the dynamic optimizer 413. In an exemplary embodiment, the steady state optimizer 410 optimizes the setpoints 420 based upon minimizing the cost functions $F_{cost1}$ and/or $F_{cost2}$, described in greater detail hereinafter, but alternative exemplary embodiments are not limited thereto.

In response to the steady state set points 420 and a dynamic feedback signal 447 from the controller 406, the dynamic module 408, provides optimized dynamic set points 455 to the controller 406. In response to the dynamic set points 455, the controller 406 provides respective output signals to the CFB combustion system 7 and the FDA system 9 to control the operation of the CFB-FDA system 15. In an exemplary embodiment, the dynamic feedback signal 447 is continually provided to the dynamic module 408, and includes the outputs 430a and 430b, but is not limited thereto.

Specifically, the dynamic optimizer 413 of the dynamic module 408 receives the optimized steady state set points 420 from the steady state optimizer 410, and model parameters 450 from the dynamic model 414. During non-transient, e.g., steady state, operation of the CFB-FDA system 17, as determined based on a value of the dynamic feedback signal 447, for example, the dynamic optimizer 413 "passes through" the optimized steady state set points 420 from the steady state optimizer 410. In this case, the dynamic optimizer 413 does not require the input parameters 450 from the dynamic model 414, and the dynamic optimizer 413 inputs the steady state set points 420 from the steady state optimizer 410 to the controller 406. In an exemplary embodiment, the controller 406 includes components such as valve operators and pump controllers, for example, which adjust operating conditions of the CFB combustion system 7 and the FDA system 9. Therefore, in steady operation, the steady state optimizer 410 receives the outputs 430a and 430b and determines the steady state set points 420 based on the economic parameters 435 and the model parameters 440 from the steady state model 412, and determines a control signal 455 (which is substantially the same as the steady state set points 420 in steady state operation) such that the steady state operation of the CFB-FDA system 17 is in economically optimized, e.g., the cost function (described above) is minimized.

During transient plant operations such as a change in load demand, as determined based on the dynamic feedback signal 447, however, the dynamic optimizer 413 adjusts the optimized setpoints 420 from the steady state optimizer 410 according to the signal 450 received from the dynamic model 414 to supply an optimized control signal 455 to the control part 406, thereby effectively optimizing operation of the CFB-FDA system 17 during plant transients.

In an exemplary embodiment, the steady state optimizer 410 and/or the dynamic optimizer 413 may be linear or nonlinear. Further, alternative exemplary embodiments may include other types of optimizers as the dynamic optimizer 413, including, but not limited to, mixed/integer programming optimizers, gradient-based optimizers, and/or stochastic (e.g., simulated annealing or nested partition) optimizers.

In addition, the dynamic optimizer 413 according to an exemplary embodiment utilizes a genetic algorithm (GA). More specifically, the GA functions as a heuristic global search algorithm which solves a constrained optimization problem, such as minimizing the cost function of the CFB-FDA system 17, as described above, for example. Furthermore, the dynamic optimizer 413 can be used in a reverse optimization mode to calculate optimum economic points based upon simulated parameters of the entire CFB-FDA system 17.

In an alternative exemplary embodiment, the dynamic optimizer 413 may be a revised genetic algorithms (GAs) optimizer designed to analyze continuous variables such as fuel flow, as well as discrete variables such as individual switch positions and/or settings of the CFB-FDA system 17. As a result, the dynamic optimizer 413 is capable of performing mixed integer GA optimization. Further, operator-observed data, e.g., heuristic knowledge of plant staff, can be incorporated into the GA such that the operator can adjust the dynamic optimizer 413 based upon prior experience. This allows the operator to further adjust and analyze optimization results. In alternative exemplary embodiments, the dynamic optimizer 413 may include a global optimizer utilizing gradient-based or stochastic optimization methods such as simulated annealing and/or nested partitions, for example, but not being limited thereto.

The dynamic model 414 can be linear or nonlinear, depending upon a configuration of the CFB-FDA system 17 and a complexity of desired parameters to be modeled. Further, the dynamic model 414 is an empirical model developed from system identification using data sets from designed tests utilizing designed dynamic testing methods, including use of single/multiple level step changes, pseudo random binary sequences (PSRBs), sinusoidal exciting/sine sweeping signals, and non-sinusoidal (e.g., wavelet) based exciting signals. In the designed tests, various effects of factors in a process such as a combustion process, as well as interactions of the factors themselves, are efficiently analyzed. This is accomplished by selecting varying input combinations and measuring the output effects of the selected input combinations. Using the designed tests ensures that sufficient variations in test data are obtained to achieve accurate optimization by the dynamic optimizer 413 of data modeled by the dynamic model 414. At the same time, requirements for physical testing, such as trial and error type testing, are substantially reduced or effectively minimized. Therefore, empirical data sufficient to accurately develop the dynamic model 414 is obtained more efficiently and with minimal variation in operation or down time of the CFB-FDA system 17.

In an alternative exemplary embodiment, the dynamic model 414 may be a first principles model developed using CFB-FDA process knowledge with or without reduced order modeling (ROM) techniques. The model can also be a hybrid model which integrates empirical models with first principle models.

As described above with respect to the steady state model 412, the dynamic model 414 may be an embedded CFB combustion system 7 model, an embedded FDA system 9 model (or models) or an embedded combined CFB-FDA system 17 model. In addition, multiple independent integrated optimization and control systems 400 may be utilized in an alternative exemplary embodiment. More specifically, in a case wherein the CFB-FDA system 17 includes more than one FDA system 9, such as shown in FIG. 4, and in which the dynamic model 414 includes more than one embedded FDA system model, each individual embedded FDA system model may be associated with its own respective integrated optimization and control systems 400 connecting it to a corresponding respective FDA system 9.

Thus, in summary, the integrated optimization and control system 400 controls the integrated operation of the CFB-FDA system 17 such that the entire CFB-FDA system 17 is operated in an overall optimal manner. Therefore, in addition to optimizing the limestone to lime ratio as described above, for example, other CFB-FDA system 17 operational parameters, e.g., the inputs 415a and 415b are optimized.

While the CFB-FDA system 17 of FIG. 2 includes one FDA system 9, the present invention contemplates that the CFB-FDA system 17 may includes a second FDA system 9b (shown in dashed lines) or more. Similar to the FDA system 9 of FIGS. 1 and 4, the second FDA system 9b functions in similar manner and includes input 415c and output 430c.

Figure 3:
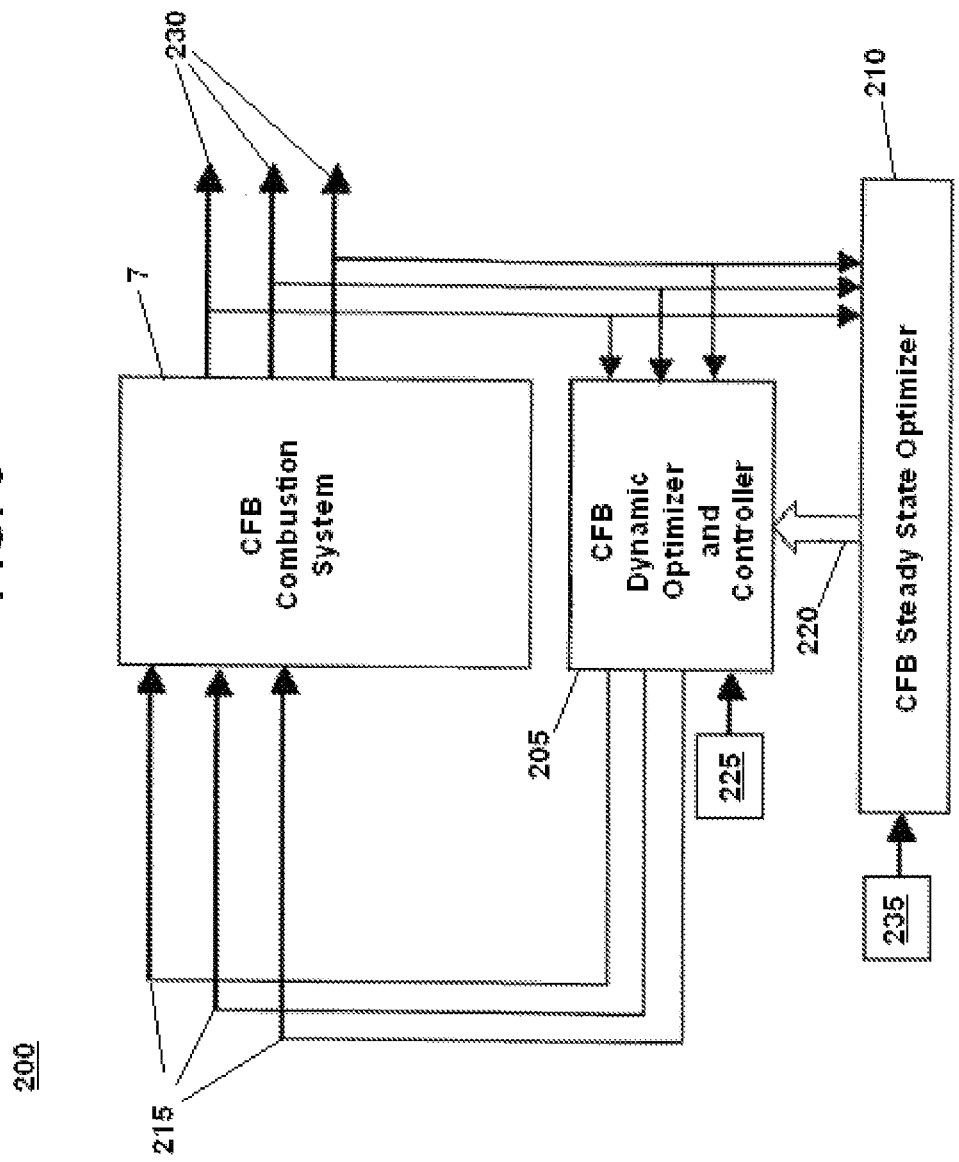
FIG. 3 is a block diagram of a controller for a CFB system in accordance with the present invention.

FIG. 3 illustrates another exemplary embodiment of the present invention that provides an optimization and control system 200 for a CFB combustion system 7. The optimization and control system 200 for the CFB combustion system 7 includes a controller 205 and an optimizer 210. More specifically, the optimization and control system 200 according to an exemplary embodiment includes a CFB dynamic optimizer and controller part 205 (hereinafter referred to as a "controller part 205") which optimizes inputs 215 for the CFB combustion system 7 based upon setpoints 220, disturbance variables (DVs) 225, and outputs 230 from the CFB combustion system, and supplies the optimized inputs 215 to the CFB combustion system. The optimization and control system 200 further includes a CFB steady state optimizer 210, which provides the setpoints 220 to the CFB controller part 205 based on economic parameters 235. In an exemplary embodiment, the CFB steady state optimizer 210 is a genetic algorithm (GA) optimizer, and may be linear or nonlinear. Further, alternative exemplary embodiments may include other types of optimizers including, but not limited to, mixed/integer programming optimizers, gradient-based optimizers, and/or stochastic (e.g., simulated annealing or nested partition) optimizers.

In an exemplary embodiment, the inputs 215 of the CFB combustion system 7 include fuel feed rate, fuel split, limestone feed rate, limestone split, bed temperature, furnace differential pressure, primary air flow, primary air pressure, secondary air flow, secondary air pressure, secondary air split, primary air to secondary air crossover level, primary air to secondary air ratio, combustor differential pressure, steam temperature, superheat temperature, reheat temperature, load demand, fuel property, ambient temperature, bed temperature, oxygen level, and heat rate.

The outputs 230 of the CFB furnace 10 include loss on ignition, $NH_3$ level, $NO_x$ level, $SO_x$ level, and CO level.

The disturbance variables 225 include load demand, fuel property variations (e.g., higher heating value, sulfur content, nitrogen content), limestone property variations, and changes in ambient conditions (e.g., temperature, pressure, relative humidity) proximate to the CFB furnace 10.

The economic parameters 235 include fuel cost, limestone cost, $NH_3$ cost, $NO_x$ trade price, $NO_x$ credit, $SO_x$ trade price, $SO_x$ credit, $CO_2$ capture cost, $CO_2$ processing cost, ash disposal cost, water cost, auxiliary power cost, and maintenance cost.

It will be noted that alternative exemplary embodiments are not limited to the foregoing lists; rather, the inputs 215, the outputs 230, the disturbance variables 225, and the economic parameters 235 may include additional variables and/or parameters not specifically listed or described herein.

Still referring to FIG. 2, the CFB steady state optimizer 210 determines optimized setpoints 220 such that the CFB combustion system 7 is operated in an economically optimal manner. Specifically, the CFB steady state optimizer 210 receives the outputs 230 from the CFB combustion system 7 and determines optimized setpoints 220 based on the economic parameters 235, which are inputted by an operator, for example. More specifically, the CFB steady state optimizer 210 computes a cost function $F_{cost1}$ and determines a set of operating parameters for the CFB combustion system 7 such that an operation thereof is economically optimized, e.g., the cost function $F_{cost1}$ is minimized. In an exemplary embodiment, the cost function $F_{cost1}$ is given according to Equation 1, but alternative exemplary embodiments are not limited thereto. For example, additional variables may be added to the cost function $F_{cost1}$, such as a lime cost, discussed in further detail below with respect to FIG. 4, and/or other appropriate variables related to optimization of an operation of the CFB combustion system 7.

$$F_{cost1} = C_{fuel} + C_{limestone} + C_{NH3} - Crd_{NO_x} + C_{ash} + C_{water} + C_{AP} \quad \text{[Equation 1]}$$

where: $C_{fuel}$ is fuel cost; $C_{limestone}$ is limestone cost; $C_{NH3}$ is $NH_3$ cost; $Crd_{NO_x}$ is $NO_x$ credit; $C_{ash}$ is ash disposal cost; $C_{water}$ is water cost; and $C_{AP}$ is auxiliary power cost.

The CFB steady state optimizer 210 provides the optimized setpoints 220 to the CFB controller 205. The CFB controller 205 then optimizes the inputs 215 based on the optimized setpoints 220, the periodic readings of the outputs 230 during system steady state conditions, and the disturbance variables 225, and subsequently outputs the optimized inputs 215 to the CFB combustion system 7, as shown in FIG. 3. As a result, the CFB combustion system 7 is operated in an optimal efficient and/or economical manner.

In an exemplary embodiment, the CFB dynamic optimizer and controller part 205 includes a CFB model predictive controls (MPC) controller. Further, the CFB controller part 205 provides real-time multiple-input, multiple-output dynamic control of the CFB combustion system 7. In an alternative exemplary embodiment, the CFB controller part 205 may be a nonlinear MPC (NMPC) controller, but is not limited thereto. Thus, the CFB controller part 205 is capable of controlling both linear and non-linear processes. In addition, the CFB controller part 205 provides control of complex, dynamic processes more effectively than is possible with conventional feedback control systems.

In an exemplary embodiment, the CFB dynamic optimizer and controller part 205 is a stand-alone supervisory system which communicates with an existing distributed control system (DCS) or, in alternative exemplary embodiments, is integral to the DCS, as will be described in further detail hereinbefore with reference to FIG. 2.

Figure 4:
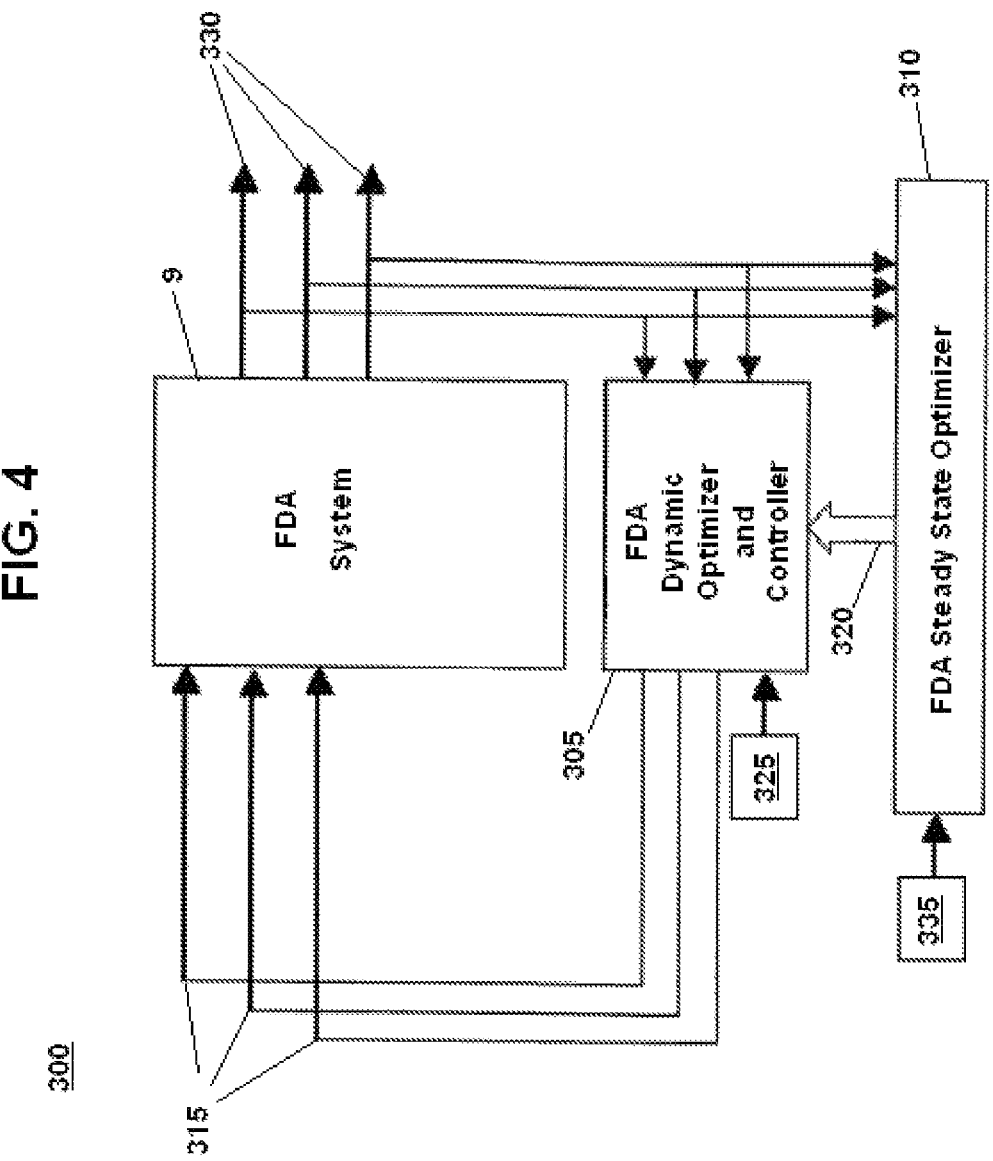
FIG. 4 is a block diagram of a control system for an FDA system in accordance with the present invention.

FIG. 4 illustrates another exemplary embodiment of the present invention that provides an optimization and control system 300 for an FDA system 9. The optimization and control system 300 for the FDA system 9 will be described in further detail. The optimization and control system 300 for the FDA system 9 includes a controller 305 and an optimizer 310. More specifically, the optimization and control system 300 according to an exemplary embodiment includes an FDA dynamic optimizer and controller 305 (hereinafter referred to as an "FDA controller 305") which optimizes inputs 315 for the FDA system 9 based upon setpoints 320, disturbance variables 325, and outputs 330 from the FDA 15. The FDA controller part 305 then supplies optimized inputs 315 to the FDA system 9.

The optimization and control system 300 further includes an FDA steady state optimizer 310 which provides optimized setpoints 320 to the FDA controller 305 based on economic parameters 335.

In an exemplary embodiment, the inputs 315 of the FDA system 9 include water flow, circulation rate, lime flow, inlet $SO_2$, inlet humidity, and inlet temperature.

The outputs 330 of the FDA system 9 include outlet $SO_2$, outlet temperature, outlet humidity, and relative humidity.

The disturbance variables 325 include load demand, fuel property variations (e.g., higher heating value, sulfur content, nitrogen content), limestone property variations, lime property variations, and changes in ambient conditions (e.g., temperature, pressure, relative humidity) proximate to the FDA.

The economic parameters 335 include fuel cost, limestone cost, lime cost, $NH_3$ cost, $NO_x$ trade price, $NO_x$ credit, $SO_x$ trade price, $SO_x$ credit, $CO_2$ capture cost, $CO_2$ processing cost, ash disposal cost, water cost, auxiliary power cost, and maintenance cost. It will be noted that alternative exemplary embodiments are not limited to the foregoing lists; rather, the inputs 315, the outputs 330, the disturbance variables 325, and the economic parameters 335 may include additional variables and/or parameters not specifically listed or described herein.

The FDA steady state optimizer 310 determines optimized setpoints 320 such that the FDA system 9 is operated in an economically optimal manner. Specifically, the FDA steady state optimizer 310 receives the outputs 330 from the FDA system 9 and determines the optimized setpoints 320 based on the economic parameters 335, which in an exemplary embodiment are inputted by an operator, for example. More specifically, the FDA steady state optimizer 310 computes a cost function $F_{cost2}$ and determines a set of operating parameters for the FDA system 9 such that an operation thereof is in economically optimized, e.g., the cost function $F_{cost2}$ is minimized. In an exemplary embodiment, the cost function $F_{cost2}$ is given according to Equation 2, but alternative exemplary embodiments are not limited thereto.

$$F_{cost2} = C_{fuel} + C_{limestone} + C_{lime} + C_{NH3} - Crd_{NO_x} + C_{ash} + C_{water} + C_{AP}$$ [Equation 2]

where: $C_{fuel}$ is fuel cost; $C_{limestone}$ is limestone cost; $C_{lime}$ is lime cost; $C_{NH3}$ is $NH_3$ cost; $Crd_{NO_x}$ is $NO_x$ credit; $C_{ash}$ is ash disposal cost; $C_{water}$ is water cost; and $C_{AP}$ is auxiliary power cost.

The FDA steady state optimizer 310 provides the optimized setpoints 320 to the FDA controller 305. The FDA controller 305 then optimizes the inputs 315 based on the optimized setpoints 320, the outputs 330, and the disturbance variables 325, and subsequently outputs the optimized inputs 315 to the FDA system 9, as shown in FIG. 4. As a result, the FDA system is operated in an optimal efficient and/or economical manner.

Figure 5:
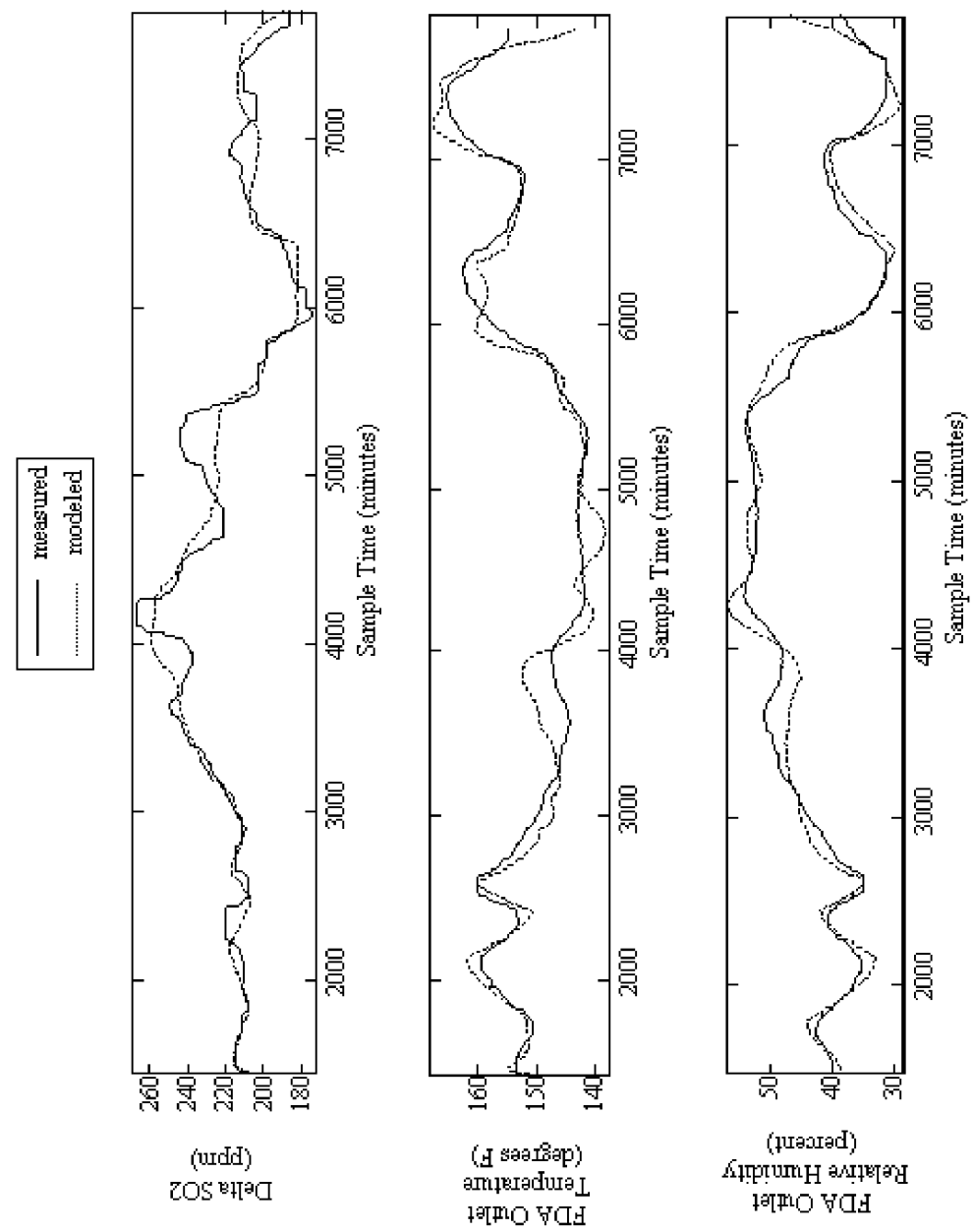
FIG. 5 is a set of graphs illustrating comparisons between modeled parameters of an integrated modeling and optimization system for a CFB-FDA system and corresponding measured parameters of an actual CFB-FDA system in accordance with the present invention.

To compare modeled parameters of the integrated optimization and control system 400 of FIG. 2 according to an exemplary embodiment with actual measured parameters of a fielded CFB-FDA system, a dynamic performance test was conducted. Specifically, for FDA controls, four manipulated variables (MVs), e.g., FDA inputs 315 (FIG. 4), namely water flow, circulation rate, lime flow and FDA inlet temperature, one disturbance variable (DV) 325 (FIG. 4) of inlet $SO_2$ from a CFB furnace (FIG. 3), and three (3) controlled variables (CVs), e.g., FDA outputs 330 (FIG. 4), namely FDA outlet $SO_2$, FDA outlet temperature, and FDA outlet RH) were analyzed. Then, modeled and measured delta $SO_2$ (reduction in $SO_2$ from an inlet to an outlet of the FDA), FDA outlet temperature and FDA outlet RH were compared. Results of the dynamic performance test are illustrated in FIG. 5. It can be seen in FIG. 5 that modeled parameters substantially tracked with actual measured parameters. More specifically, modeled delta $SO_2$, FDA outlet temperature and FDA outlet RH tracked with measured delta $SO_2$, FDA outlet temperature and FDA outlet RH, respectively.

Thus, an integrated modeling and optimization controller according to an exemplary embodiment provides optimized control of an integrated CFB-FDA system, thereby allowing economically efficient use of fuel, limestone, lime, and water, for example, according to plant conditions at any given time, particularly during transients in plant operations. Economic efficiency of operation of the CFB-FDA system is further enhanced by incorporating an FDA relative humidity input to the modeling and optimization controller of the integrated CFB-FDA system.

In addition, the modeling and optimization controller may be incorporated as a stand alone system or, alternatively, as an embedded controller, thereby allowing for a standardized package which may be implemented into FBC power plants which use different types of boilers, such as BFB boilers, as well as different APC systems such as SCR, SNCR, FGD systems, electrostatic precipitators, mercury capture, and $CO_2$ capture and/or processing systems, for example.

It will be noted that while exemplary embodiments have been described with reference to a CFB boiler, alternative exemplary embodiments are not limited thereto. For example, the term FBC covers a range of fluidized bed processes, including CFB boilers, bubbling fluidized bed (BFB) boilers, moving fluidized bed boilers and other variations thereof. Thus, alternative exemplary embodiments may be utilized in conjunction with any type of FBC power plant. Similarly, although an FDA has been described in reference to exemplary embodiments, alternative exemplary embodiments may include a spray dryer absorber, a wet flue gas desulfurization system, a dry flue gas desulfurization system, an SCR/SNCR) system, a mercury capture system, a $CO_2$ capture system, an electrostatic precipitator and a filter, for example, but are not limited thereto.

In addition, the integrated optimization and control system 400 and both the optimization and control systems of the CFB and the FDA 200, 300 respectively, according to exemplary embodiments each include computer hardware and/or software components or systems suitable for operation of the integrated optimization and control system 400, such as for allowing a user to input and review the economic parameters 435 (FIG. 2). For example, the integrated optimization and control system 400 may include a computer processor, storage medium, video display, keyboard, mouse, user interface, and memory, for example, but alternative exemplary embodiments are not limited thereto.

The optimization and control systems 200, 300, 400 each electronically provide a signal indicative of input and output parameters, and input and output variables, of the CFB-FDA system, CFB system, and FDA system that may be displayed on a monitored, printed, or otherwise conveyed to the operator. Further, the optimization and control systems 200, 300, 400 provides signals to control devices of the systems 200, 300, 400, such as valves, pumps, fans, motors, and other controllable devices used to operate the systems.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for optimizing and controlling a circulating fluidized bed combustion system and an air pollution control system, the system comprising:
   a circulating fluidized bed combustion system and an air pollution control system that are operably connected to each other;
   a controller operably connected to the fluidized bed combustion system and/or the air pollution control system; and
   an optimizer operably connected to the controller wherein the optimizer is operative to provide a setpoint to the controller based on an economic parameter and a system output obtained from the fluidized bed combustion system and/or the air pollution control system;
   wherein the controller is operative to provide an input to the fluidized bed combustion system and/or the air pollution control system based on the setpoint from the optimizer to control operation of the fluidized bed combustion system and/or the air pollution control system; and
   wherein the optimizer includes a steady state optimizer for providing a steady state setpoint, and a dynamic optimizer for adjusting the steady state setpoint according to dynamic behavior of the circulating fluid bed combustion system and/or the air pollution control system.

2. The system of claim 1, wherein the air pollution control system comprises:
   one of a flash dryer absorber, a spray dryer absorber, a wet flue gas desulfurization system, a dry flue gas desulfurization system, a selective catalytic reduction system, a selective non-catalytic reduction system, a mercury capture system, a carbon dioxide capture system, an electrostatic precipitator and a filter.

3. The system of claim 2, wherein the air pollution control system comprises:
   a humidity sensor operably connected to the air pollution control system, and the system output will provide a relative humidity signal from the humidity sensor.

4. The system of claim 1, wherein at least one of the optimizer and the controller comprises:
   a nonlinear genetic algorithm optimizer and/or a model predictive controller.

5. The system of claim 1, wherein:
   the input provided by the controller includes:
   at least one of fuel feed rate, fuel split, limestone feed rate, limestone split, bed temperature, furnace differential pressure, primary air flow, primary air pressure, secondary air flow, secondary air pressure, secondary air split, primary air to secondary air crossover level, primary air to secondary air ratio, combustor differential pressure, steam temperature, superheat temperature, reheat temperature, load demand, fuel property, ambient temperature, bed temperature, oxygen level, heat rate, water flow, circulation rate, lime flow, inlet $SO_2$, inlet humidity and inlet temperature;
   the system output includes at least one of loss on ignition, $NH_3$ level, $NO_x$ level, $SO_x$ level, CO level, $SO_2$, outlet temperature, outlet humidity and relative humidity; and
   the economic parameter includes at least one of fuel cost, limestone cost, $NH_3$ cost, $NO_x$ trade price, $NO_x$ credit, $SO_x$ trade price, $SO_x$ credit, $CO_2$ capture cost, $CO_2$ processing cost, ash disposal cost, water cost, auxiliary power cost and maintenance cost.

6. The system of claim 1, comprising:
   an overall optimization and modeling software module operably connected to the controller and including one of a steady state model and a dynamic model;
   wherein the air pollution control system is an FDA system; and
   wherein the one of the steady state model and the dynamic model includes an embedded combined CFB-FDA model.

7. The system of claim 1, comprising:
   an overall optimization and modeling software module operably connected to the controller and including one of a steady state model and a dynamic model;
   wherein the air pollution control system is an FDA system; and
   wherein the one of the steady state model and the dynamic model includes an embedded CFB combustion model, an embedded FDA model or models and/or an embedded combined CFB-FDA model.

8. The system of claim 1, comprising:
   one of a computer processor, a storage medium, a video display, a keyboard, a mouse, a user interface and a memory operably connected to the optimizer.

9. A system for optimizing and controlling a flash dryer absorber, the system comprising:
   a flash dryer absorber;
   a circulating bed combustion system;
   a controller operably connected to the flash dryer absorber; and
   a steady state optimizer operably connected to a dynamic optimizer, the dynamic optimizer being connected to the controller;
   wherein the steady state optimizer is operative to receive an output from the flash dryer absorber for outputting a steady state setpoint based on an economic parameter and/or the output from the flash dryer absorber;
   wherein the dynamic optimizer is arranged for adjusting the steady state setpoint according to dynamic behavior of the circulating bed combustion system and/or the flash dryer absorber; and
   wherein the controller is operative to receive the output from the flash dryer absorber for outputting an input to the flash dryer absorber based on the output from the flash dryer absorber and the setpoint from the dynamic optimizer such that the input from the controller controls operation of the flash dryer absorber.

10. The system of claim 9, wherein at least one of the steady state optimizer and the controller comprises:
    a nonlinear genetic algorithm optimizer.

11. The system of claim 9, wherein the controller comprises:
    a model predictive controller.

12. The system of claim 9, wherein:
    the input for the controller includes at least one of water flow, circulation rate, lime flow, inlet $SO_2$, inlet humidity and inlet temperature;
    the output includes at least one of $SO_2$, outlet temperature, outlet humidity and relative humidity; and
    the economic parameter includes at least one of fuel cost, limestone cost, lime cost, $NH_3$ cost, NO trade price, NO credit, $SO_x$ trade price, $SO_x$ credit, $CO_2$ capture cost, $CO_2$ processing cost, ash disposal cost, water cost, auxiliary power cost and maintenance cost.

13. The system of claim 9, comprising:
an overall optimization and modeling software module including at least one of a steady state model and a dynamic model which provide parameters to the controller; and
the circulating bed combustion system upstream of the flash dryer absorber;
wherein the at least one of the steady state model and the dynamic model includes an embedded combined CFB-FDA model.

14. The system of claim 9, comprising:
an overall optimization and modeling software module including at least one of a steady state model and a dynamic model which provide parameters to the controller; and
the circulating bed combustion system upstream of the flash dryer absorber;
wherein the at least one of the steady state model and the dynamic model comprises an embedded CFB combustion model, an embedded FDA model or models and/or an embedded combined CFB-FDA model.

15. A system for optimizing and controlling a power plant comprising a circulating fluidized bed combustion system and a flash dryer absorber, the system comprising:
a circulating fluidized bed combustion system and a flash dryer absorber;
a controller operably connected to the fluidized bed combustion system and the flash dryer absorber; and
an optimizer operably connected to the controller;
wherein the optimizer is operative to provide optimized setpoints to the controller based on economic parameters and system outputs from the fluidized bed combustion system and the flash dryer absorber;
wherein the optimizer includes a steady state optimizer for providing a steady state setpoint, and a dynamic optimizer arranged for adjusting the steady state setpoint according to dynamic behavior of the circulating fluid bed combustion system and/or the flash dryer absorber; and
wherein the controller is operative to provide inputs to the fluidized bed combustion system and/or the flash dryer absorber based on the setpoints from the optimizer to control operation of the fluidized bed combustion system and/or the flash dryer absorber.

16. The system of claim 15, wherein the flash dryer absorber comprises:
a humidity sensor operably connected to the flash dryer absorber; and
the system output includes a relative humidity signal from the humidity sensor.

17. The system of claim 15, comprising:
an overall optimization and modeling module operably connected to the controller and including one of a steady state model and a dynamic model;
wherein the one of the steady state model and the dynamic model includes an embedded combined CFB-FDA model.

18. The system of claim 17, wherein the one of a steady state model and a dynamic model comprises:
one of an empirical model, a first principles model, a hybrid empirical-first principles model and a nonlinear model.

19. The system of claim 15, wherein:
the inputs include at least one of fuel feed rate, fuel split, limestone feed rate, limestone split, bed temperature, furnace differential pressure, primary air flow, primary air pressure, secondary air flow, secondary air pressure, secondary air split, primary air to secondary air crossover level, primary air to secondary air ratio, combustor differential pressure, steam temperature, superheat temperature, reheat temperature, load demand, fuel property, ambient temperature, bed temperature, oxygen level, heat rate, water flow, circulation rate, lime flow, inlet $SO_2$, inlet humidity and inlet temperature;
the system outputs include at least one of loss on ignition, $NH_3$ level, $NO_x$ level, $SO_x$ level, CO level, $SO_2$, outlet temperature, outlet humidity and relative humidity; and
the economic parameters include at least one of fuel cost, limestone cost, $NH_3$ trade price, $NO_x$ trade price, $NO_x$ credit, $SO_x$ trade price, $SO_x$ credit, $CO_2$ capture cost, $CO_2$ processing cost, ash disposal cost, water cost, auxiliary power cost and maintenance cost.

* * * * *